United States Patent
Fisher et al.

[19]

[11] Patent Number: 6,121,746
[45] Date of Patent: Sep. 19, 2000

[54] SPEED REDUCTION SWITCH

[75] Inventors: Lynn Edwin Fisher, Fort Wayne; Eric A. Depner, Auburn, both of Ind.

[73] Assignee: General Electric Company, Schenectady, N.Y.

[21] Appl. No.: 09/329,827

[22] Filed: Jun. 10, 1999

[51] Int. Cl.[7] .................................................. H02P 5/28
[52] U.S. Cl. ................... 318/772; 318/773; 318/775; 318/776; 318/524
[58] Field of Search ................................. 318/772, 773, 318/775, 777, 778, 521, 523, 524, 471, 484; 388/808, 838, 921; 417/19

[56] References Cited

U.S. PATENT DOCUMENTS

| | | | |
|---|---|---|---|
| 3,957,395 | 5/1976 | Ensign | 417/12 |
| 4,030,008 | 6/1977 | Buckle et al. | 318/220 |
| 4,064,420 | 12/1977 | Yuda et al. | 318/224 A |
| 4,145,645 | 3/1979 | Price et al. | 318/762 |
| 4,249,118 | 2/1981 | Roof | 318/305 |
| 4,263,540 | 4/1981 | Brandt et al. | 318/775 |
| 4,348,626 | 9/1982 | London | 318/772 |
| 4,808,077 | 2/1989 | Kan et al. | 417/2 |
| 4,867,871 | 9/1989 | Bowne | 210/97 |
| 4,897,022 | 1/1990 | Hudson | 417/7 |
| 5,241,253 | 8/1993 | Schlangen | 318/779 |
| 5,253,982 | 10/1993 | Niemiec et al. | 417/38 |
| 5,357,800 | 10/1994 | Reuter et al. | 73/121 |
| 5,538,396 | 7/1996 | Meierhoefer | 417/19 |

*Primary Examiner*—Paul Ip
*Assistant Examiner*—Rita Leykin
*Attorney, Agent, or Firm*—Carl B. Horton, Esq.; Damian Wasserbauer, Esq.; Armstrong Teasdale LLP

[57] ABSTRACT

A speed reduction switch for a multiple speed induction motor includes a speed selector switch and a delay element. As the motor is switched from a high speed to a lower speed, the delay element temporarily prevents electrical connection of a motor auxiliary winding for low speed operation. The motor is therefore de-energized and slows down. After a preselected delay, the delay element connects the motor auxiliary winding when the motor is at a lower speed so that little magnetic braking of the motor occurs, and the motor smoothly transitions from a higher speed to a lower speed.

17 Claims, 2 Drawing Sheets

1

SPEED REDUCTION SWITCH

BACKGROUND OF THE INVENTION

This invention relates generally to electric motors and, more particularly, to a speed reduction switch for multiple speed induction motors.

Two speed induction motors are commonly used in swimming pool and spa pumps. Typically, induction motors include a magnetized rotor and a stator having a number of windings that form magnetic poles. When the magnetic poles of the stator are energized, the magnetic field in the windings creates a torque that causes the rotor to rotate. The magnetic field may be varied to change the speed of the motor. For example, a two pole/four pole motor has a high speed that corresponds to the energization of a "main" two pole winding, and a low speed that corresponds to the energization of an "auxiliary" four pole winding. The high and low speeds are selected as desired with an external switch.

Switching between the high and low speeds, however, can be problematic. The speed of the motor is inversely proportional to the number of stator poles, so the rotor of a four pole stator will generally rotate at about half the rate of a the rotor of a two pole stator when energized by the same power source. For example, a typical two pole/four pole motor in high speed rotates at about 3450 rpm, and rotates at about 1725 rpm in low speed. When the motor is switched from high speed to low speed, the rotor is abruptly braked to the low speed by the changed stator magnetic field. The rapid braking often causes unpleasant noise and vibration, which at least on some occasions leads to OEM (Original Equipment Manufacturers) rejection and field returns.

Accordingly, it would be desirable to provide a multiple speed motor that may be smoothly and quietly switched from higher speeds to lower speeds to prevent objectionable noise and vibration.

BRIEF SUMMARY OF THE INVENTION

In an exemplary embodiment of the invention, a speed reduction switch for a multiple speed induction motor includes a speed selector switch and a delay element. The speed selector switch has a first throw connected to a first set of motor windings for high speed operation of the motor, and a second throw connected to a second set of windings for low speed operation of the motor. The delay element is electrically connected between the second throw and the second set of windings and is in series with the second throw of the speed selector switch.

When the motor is switched from high speed to low speed via the speed selector switch, i.e., when the speed selector switch is switched from the first throw to the second throw, the delay element delays the electrical connection of the second set of windings. The delay temporarily de-energizes the motor and allows the motor to coast, i.e., the speed decreases. When the second set of windings is connected after an appropriate delay, the motor speed is approximately at the low speed so that little magnetic braking of the rotor occurs. Braking noise and vibration is therefore reduced, if not eliminated. Thus, smoother, quieter motor operation from a high speed to a low speed is achieved, unpleasant motor noise and vibration is avoided, and instances of OEM motor rejection or field returns of motors are reduced.

DETAILED DESCRIPTION OF THE INVENTION

Figure 1:
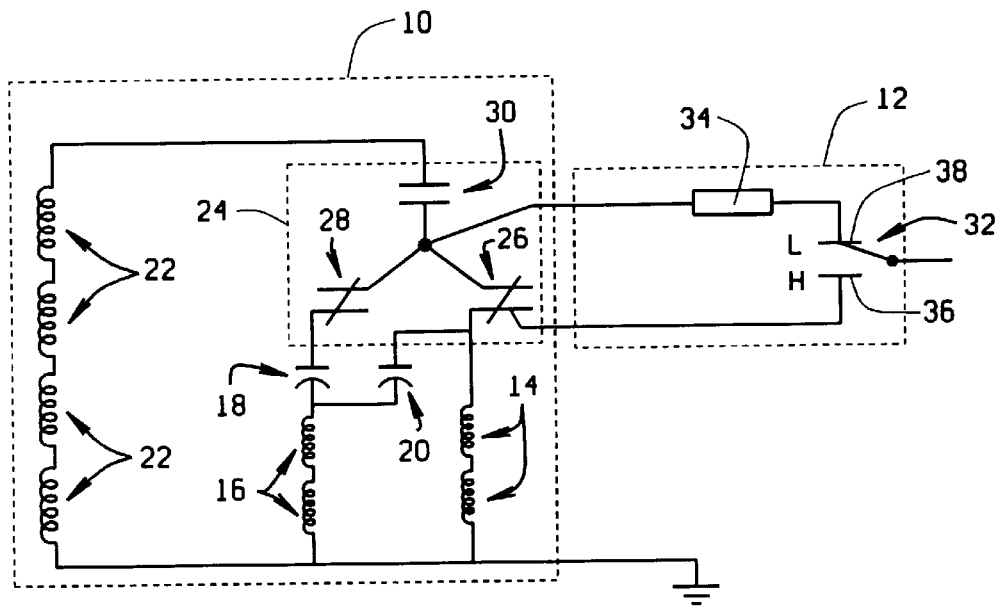
FIG. 1 is a circuit schematic of a dual speed motor including a speed reduction switch according to a first embodiment of the invention.

FIG. 1 is a circuit schematic of an induction motor 10 including a speed reduction switch 12. Motor 10 includes a two pole main winding 14, a two pole start winding 16, a start capacitor 18, a run capacitor 20, a four pole auxiliary winding 22, and a centrifugal start switch 24. Motor 10 is a dual speed two pole/four pole motor. In high speed operation, two pole main winding 14 is energized. In low speed operation, four pole auxiliary winding 22 is energized. In alternative embodiments, motor 10 has main and auxiliary windings with more than two poles and four poles, respectively. In a further alternative embodiment, motor 10 has more than two speeds.

Start winding 16 is used to initiate rotation of a rotor (not shown). Main winding 14 has a high inductive reactance relative to start winding 16, so that the magnetic fields generated in respective windings 14, 16 are out of phase with one another. The geometric time phase relationship between the magnetic fields causes the rotor to begin to rotate from a standstill condition when windings 14, 16 are energized.

Start capacitor 18 is connected in series with start winding 16 and creates phase displacement between the currents flowing through start winding 16 and main winding 14 to increase the starting torque of motor 10. Run capacitor 20 is also connected in series with start winding 16 so that start winding 16 may be used as an auxiliary winding after motor start-up and to increase motor efficiency and power factor.

Centrifugal start switch 24 includes a combination of contacts for switching main winding 14, start winding 16, and auxiliary winding 22 in response to the rotational speed of motor 10. Specifically, centrifugal start switch includes a pair of "main" contacts 26, a pair of "cutout" contacts 28, and a pair of "auxiliary" contacts 30. At start-up, main contacts 26 and cutout contacts 28 are closed so that current flows through both main winding 14 and start winding 16 to generate the required torque to cause the rotor to rotate. After motor start-up, main contacts 26 and cutout contacts 28 are open, and auxiliary contacts 30 are closed. If speed selector switch 32 is at second throw 38, motor 10 runs at low speed. If speed selector switch is at first throw 36, motor 10 runs at high speed, start capacitor 18 is disconnected from the circuit, and start winding remains in the circuit via run capacitor 20. As motor 10 includes only a two pole start winding 16, motor 10 starts in high speed mode. In an alternative embodiment, an auxiliary start winding is included so that motor 10 may be started in low speed.

Speed reduction switch 12 includes a speed selector switch 32 and a delay element 34. Speed selector switch 32 includes a first throw 36 operatively connected to main winding 14, and a second throw 38 operatively connected to auxiliary winding 22. In high speed operation of motor 10, speed selector switch 32 is positioned to first throw 36, auxiliary contacts 30 are open, main contacts 26 are closed and main winding 14 is energized. In low speed operation of motor 10, speed selector switch 32 is positioned to second throw 38, and after motor 10 has achieved operating speed, main contacts 26 and cutout contacts 28 are open, and auxiliary contacts 30 are closed so auxiliary winding 22 is energized.

Delay element 34 is electrically connected in series with speed selector switch second throw 38 and is connected between speed selector switch second throw 38 and auxiliary winding 22. Delay element 34 is a time delay that prevents instantaneous connection of auxiliary winding 22. When speed selector switch 32 is switched from first throw 36 to second throw 38, main contacts 26 are opened and main winding 14 is disconnected from the motor circuit. Delay element 34, however, prevents energiziation of auxiliary winding 22 while motor 10 is operating at high speed. Hence, during the time delay, motor 10 is temporarily de-energized, the voltage in main winding 14 decays, and motor 10 slows down.

Delay element 34 is a negative temperature coefficient resistor, a time delay relay switch or another known electrical element for temporarily delaying an electrical connection. Delay element 34 is selected to prevent electrical connection of auxiliary winding 22 for a predetermined time until the speed of motor 10 slows from the high speed to a reduced speed that approaches the low speed where auxiliary winding 22 may be energized with little perceptible magnetic braking noise and vibration. For example, a two pole/four pole motor operating at a high speed of 3450 rpm and a low speed of 1725 rpm requires a time delay of approximately 0.3 to 0.5 seconds to smoothly transition the motor from high speed to low speed.

Figure 2:
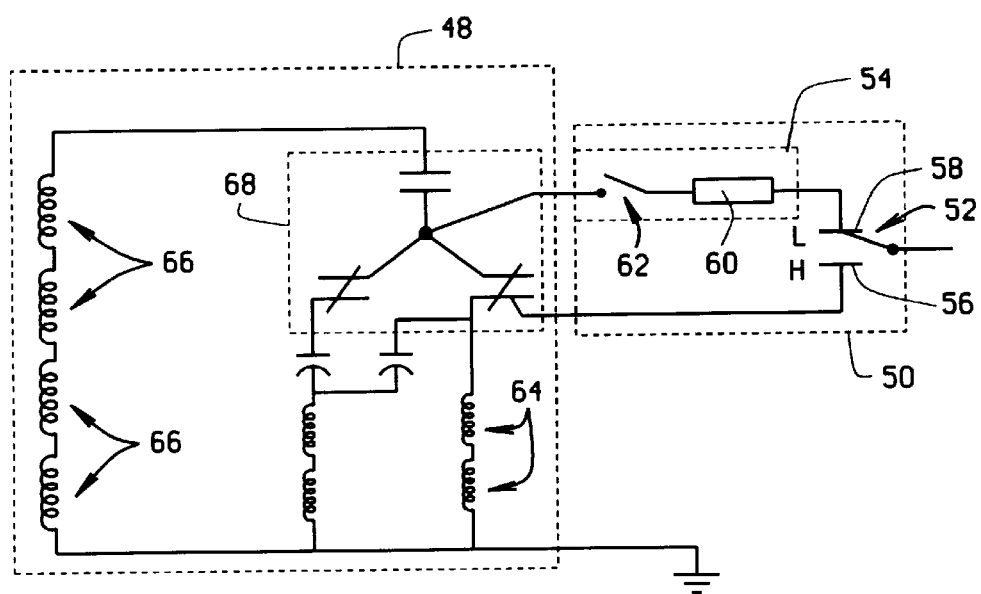
FIG. 2 is a circuit schematic of a dual speed motor including a speed reduction switch according to a second embodiment of the invention.

FIG. 2 illustrates a circuit schematic of a second embodiment of the invention including a motor 48 and a speed reduction switch 50. Speed reduction switch 50 includes a speed selector switch 52 and a delay element 54. Speed selector switch 52 includes a first throw 56 and a second throw 58 operatively connected to motor main winding 64 and auxiliary winding 66, respectively, for high speed operation of motor 48 and low speed operation of motor 48, respectively.

Delay element 54 is electrically connected between speed selector second throw 58 and centrifugal start switch 68, and prevents energization of auxiliary winding 66 until motor 48 reaches a predetermined speed which reduces braking noise and vibration. Delay element 54 includes a pressure sensor 60 in communication with a pump discharge (not shown) through which motor 48 pumps a fluid, and a pressure cutout switch 62. Pressure sensor 60 is one of several available transducers for monitoring a pressure of fluid at the pump discharge, which is directly correlated to the speed of motor 48. Pressure sensor 60 is connected to a microprocessor or other control (not shown) for opening and closing pressure cutout switch 62 in response to the sensed pressure. Pressure sensor 60 is therefore used cooperatively with cutout switch 62 to prevent connection of auxiliary winding 66 when motor 48 is operating above a predetermined speed by closing pressure cutout switch 62 only when the sensed pressure is below a predetermined level.

Figure 3:
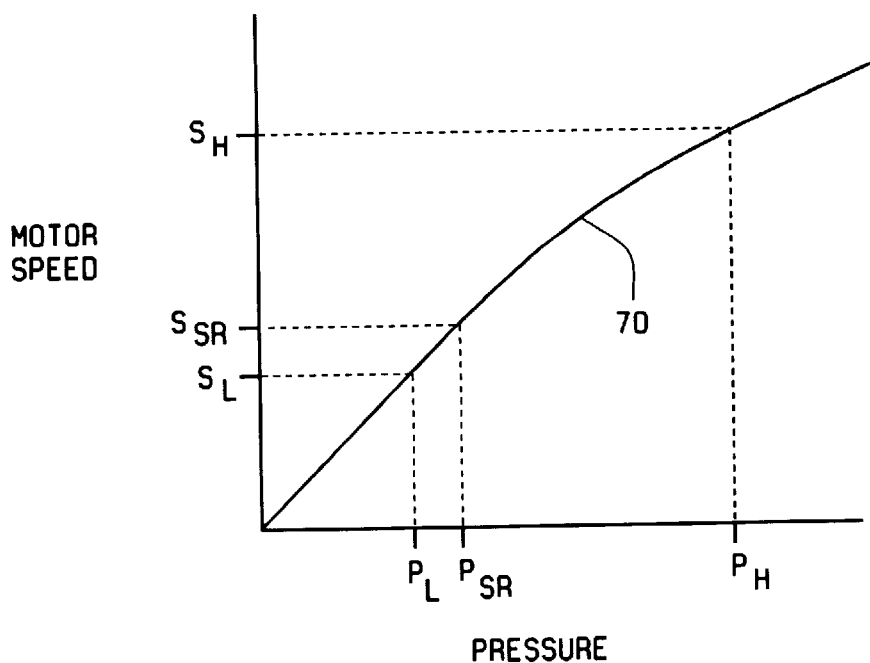
FIG. 3 is a pressure profile of the system shown in FIG. 2.

FIG. 3 illustrates a pressure profile of the embodiment shown in FIG. 2. A speed/pressure curve 70 captures the relationship between motor speed and pump discharge pressure. When motor 48 (shown in FIG. 2) is operated at high speed $S_H$, a corresponding high pressure $P_H$ occurs at the pump discharge. When motor 48 is operated at low speed $S_L$, a corresponding pressure $P_L$ occurs at the pump discharge. When motor 48 is switched from high speed $S_H$ to low speed $S_L$, main winding 64 (shown in FIG. 2) is electrically disconnected, and because pressure cutout switch 62 (shown in FIG. 2) remains open, motor 48 is de-energized. Consequently, motor speed decreases and the pump discharge pressure decreases along pressure curve 70. Pressure cutout switch 62 remains open until the sensed pressure equals or falls below an acceptable speed reduction pressure $P_{SR}$. Pressure cutout switch 62 is then closed and auxiliary winding 66 (shown in FIG. 2) is energized for low speed operation. Because the corresponding speed $S_{SR}$ of motor 48 when pressure cutout switch 62 closes is only slightly above the low speed $S_L$, little magnetic vibration and noise occurs, and motor 10 smoothly transitions to low speed operation.

Figure 4:
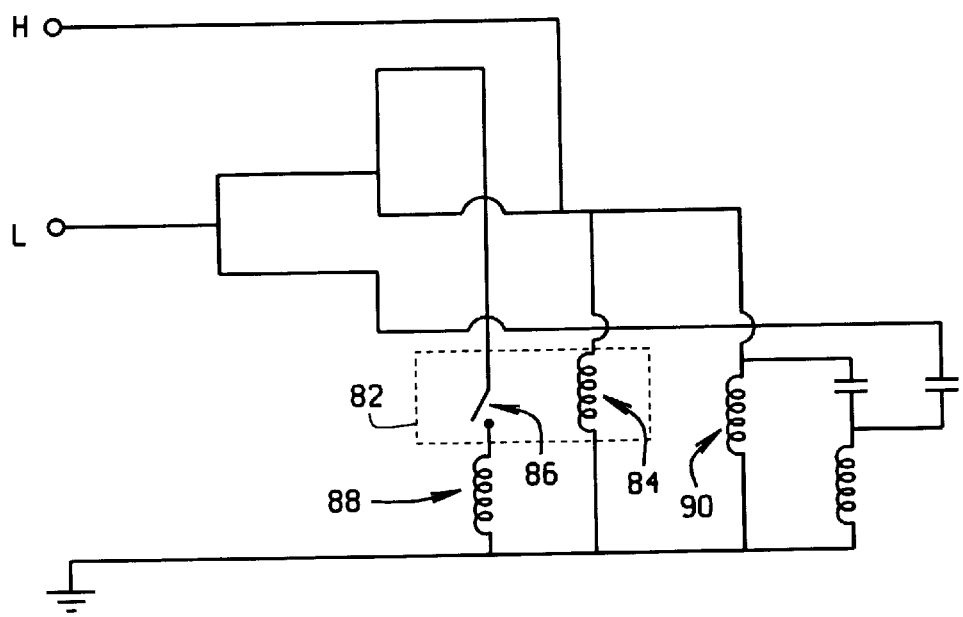
FIG. 4 is a circuit schematic of a dual speed motor including a speed reduction switch according to a third embodiment of the invention.

FIG. 4 is a schematic illustration of a third embodiment of the invention including a voltage relay switch 82 to prevent connection of an auxiliary motor winding 88 when motor speed is unacceptably high. Voltage relay switch 82 includes a relay coil 84 that generates a magnetic field to open a moveable contact 86 electrically connected in series with auxiliary winding 88. Voltage relay coil 84 is connected across a motor main winding 90 so that the voltage across voltage relay coil 84 equals the voltage across main winding 90. When the motor is running at high speed, the voltage across voltage relay coil 84 generates a sufficient magnetic field to keep voltage relay switch 82 open so that auxiliary winding 88 is electrically disconnected from the motor circuit.

When the motor is switched from high speed connection H to low speed connection L, main winding 90 is electrically disconnected from the circuit and, because voltage relay switch 82 is open, auxiliary winding 88 is also disconnected from the circuit. Thus, the voltage in main winding 90 decays, and the voltage in voltage relay coil 84 decays accordingly. As the voltage in main winding 90 decays, motor speed decreases, until the voltage reaches a predetermined level where the magnetic field generated in voltage relay coil 84 is insufficient to keep moveable contact 86 in an open position. Voltage relay switch 82 then closes and auxiliary winding 88 is energized. Because the motor speed at the corresponding voltage when voltage relay switch 82 closes is approximately the low speed of the motor, braking noise and vibration are reduced to de minimis levels.

The above-described embodiments of the invention enable a multiple speed motor to be smoothly and quietly switched from higher speeds to lower speeds. Therefore, a more enjoyable motor operating environment is achieved, and instances of OEM rejection and field returns because of excessive braking noise and vibration are avoided.

While the invention has been described in terms of various specific embodiments, those skilled in the art will recognize that the invention can be practiced with modification within the spirit and scope of the claims.

What is claimed is:

1. A speed reduction switch for a variable speed electric motor, the motor including at least a first set of windings for operating the motor at a first speed, and a second set of windings for operating the motor at a second speed that is lower than the first speed, said speed reduction switch comprising:

a speed selector switch comprising at least a first throw and a second throw, said first throw operationally connected to the motor to energize the first set of windings and said second throw operationally connected to the motor to energize the second set of windings; and a time delay element electrically connected in series with said second throw, said delay element delaying electrical connection between the motor and said second throw for de-energizing the motor for a predetermined period of time.

2. A speed reduction switch in accordance with claim 1 wherein said predetermined time is more than about 0.3 seconds.

3. A speed reduction switch in accordance with claim 1 wherein said predetermined time is less than about 0.5 seconds.

4. A speed reduction switch in accordance with claim 1 wherein said delay element is a negative temperature coefficient resistor.

5. A speed reduction switch in accordance with claim 1 wherein said delay element is a relay switch.

6. A speed reduction switch in accordance with claim 1 wherein said delay element is internal to the motor.

7. A speed reduction switch for a variable speed electric motor, the motor including at least a first set of windings for operating the motor at a first speed, and a second set of windings for operating the motor at a second speed that is lower than the first speed, said speed reduction switch comprising:

a speed selector switch comprising at least a first throw and a second throw, said first throw operationally connected to the motor to energize the first set of windings and said second throw operationally connected to the motor to energize the second set of windings; and a delay element electrically connected in series with said second throw, said delay element delaying electrical connection between the motor and said second throw, comprising a voltage relay switch connected across the first set of windings.

8. A speed reduction switch in accordance with claim 1 wherein the motor further includes a pump discharge, said speed delay comprises a pressure switch in communication with the pump discharge.

9. A speed reduction switch in accordance with claim 8 wherein said pressure switch comprises a pressure sensor and a cutout switch, said cutout switch having an open position preventing energization of the second set of windings and a closed position allowing energization of the second set of windings, said cutout switch opening for a selected time when said speed selector switch is switched from said first throw to said second throw to allow a specified pressure drop at the pump discharge.

10. A speed reduction switch in accordance with claim 8 wherein said pressure switch is mounted to the pump discharge.

11. A method for switching a motor from a first, high speed to a second, lower speed to reduce switch down noise in a multiple speed electric motor, the motor including at least a first set of windings for operating the motor at the first speed, a second set of windings for operating the motor at the second speed, and a speed selector switch operatively connected to the first set of windings and to the second set of windings, respectively, for high speed operation and low speed operation of the motor, said method comprising the steps of:

preventing instantaneous connection of the second set of windings when the speed selector switch is switched from the first speed to the second speed;

allowing the motor to reduce speed for a predetermined period of time; and connecting the second set of windings for low speed operation after the motor has a reduced speed.

12. A method in accordance with claim 11 wherein the predetermined time is approximately 0.3 to approximately 0.5 seconds.

13. A method in accordance with claim 11 further comprising the step of using a negative temperature coefficient resistor to delay connection of the second set of windings.

14. A method in accordance with claim 11 further comprising the step of using a relay switch to delay connection of the second set of windings.

15. A method in accordance with claim 11 further comprising the steps of:

monitoring the motor speed; and connecting the second set of windings for low speed operation only as the motor approaches a predetermined speed.

16. A method in accordance with claim 15 wherein the motor includes a pump discharge, said step of monitoring the motor speed comprises the steps of:

mounting a pressure sensor to the pump discharge; and sensing the pressure at the pump discharge.

17. A method in accordance with claim 16 wherein said step of connecting the second set of windings further comprises the steps of:

receiving an input from the pressure sensor; and closing a cutout switch to energize the second set of windings in response to the pressure sensor input.

* * * * *